US005958559A

United States Patent [19]

Torikoshi et al.

[11] Patent Number: 5,958,559

[45] Date of Patent: Sep. 28, 1999

[54] PEELABLE IMAGE RECORDING MEMBER AND IMAGE FORMING APPARATUS AND METHOD OF REUSING THE PEELABLE IMAGE RECORDER MEMBER

[75] Inventors: Kaoru Torikoshi; Takashi Imai; Isamu Suzuki, all of Minami-Ashigara, Japan

[73] Assignee: Fuji Xerox Co., Ltd., Tokyo, Japan

[21] Appl. No.: 08/762,420

[22] Filed: Dec. 9, 1996

[30] Foreign Application Priority Data

Dec. 13, 1995 [JP] Japan .................................... 7-324704

[51] Int. Cl.$^{6}$ ........................................................ B32B 3/00

[52] U.S. Cl. .......................... 428/195; 428/204; 428/447; 428/488.4; 428/913; 428/914; 346/77 R; 346/135.1; 427/256

[58] Field of Search ..................................... 428/195, 204, 428/488.4, 411.1, 913, 914, 447; 427/256; 346/76.1, 135.1, 77 R; 503/227

[56] References Cited

U.S. PATENT DOCUMENTS 5,430,002 7/1995 Tamura et al. .......................... 503/227

FOREIGN PATENT DOCUMENTS

A-0 629 512 12/1994 European Pat. Off. .
B-36-10231 7/1936 Japan .
B2-61-28688 7/1986 Japan .
A-1-101576 4/1989 Japan .
A-1-101577 4/1989 Japan .
A-1-297294 11/1989 Japan .
A-4-67043 3/1992 Japan .
A-4-300395 10/1992 Japan .
A-6-208318 7/1994 Japan .
A-6-219068 8/1994 Japan .
A-6-250569 9/1994 Japan .
A-6-250570 9/1994 Japan .

*Primary Examiner*—Elizabeth Evans
*Attorney, Agent, or Firm*—Oliff & Berridge, PLC

[57] ABSTRACT

The present invention provides a reusable image recording material comprising an imaging member formed with good fixing properties, which can be obtained by an image forming device. The imaging member can be removed from said image recording material by a method for reusing the image recording material. A reusable image recording material comprises a substrate such as paper and a film which is comprised of an imaging member containing a releasing material such as wax, said film being formed on the surface of said substrate: an image forming device utilizing an electrophotographic system or a heat transfer system; and a method for reusing an image recording material, which comprises bringing an image and a transfer medium into close contact and applying heat and pressure to transfer the image to the transfer medium.

17 Claims, 2 Drawing Sheets

PEELABLE IMAGE RECORDING MEMBER AND IMAGE FORMING APPARATUS AND METHOD OF REUSING THE PEELABLE IMAGE RECORDER MEMBER

BACKGROUND OF THE INVENTION

FIELD OF THE INVENTION

The present invention relates to a peelable image recording member, an image forming apparatus of the image forming member and a reusing method of the image forming member. More particularly, it relates to an apparatus of removing an imaging member from the image forming member on which the imaging member is held by an image forming apparatus using an electrophotographic or heat transfer system, and a peelable image recording member, capable of repeating image formation due to use of an imaging member and removal of an image in accordance with a method of reusing the image forming member utilizing an image forming apparatus equipped with the device of removing the imaging member.

Recently, problems about the earth environment have come to the front and importance of protection of forest resources have been recognized and, therefore, saving of wood resources as paper raw materials has become an important problem. At present, papers once used are not disposed and reuse of them as waste papers have been advanced. Although reuse of waste papers is recovery of resources, there arose a lot of problems until reused papers are made. In case of recovering waste papers, particularly in a company, there are various problems with respect to leakage of confidential documents and data; working of recovery with dividing according to the kind of papers and conveyance; and place for gathering recovered waste papers and their storage. In case of reusing waste papers, the length of pulp fibers becomes short by pulping them again, which results in deterioration of quality. Also, a device for removing ink of the image part is required. Since a paper-making device per se is huge, complicated and expensive, no paper reuse is remotely possible by the individual and, therefore, paper reuse is compelled to rely on a certain specific company. If these recovery with dividing, conveyance, gathering and operation of a huge device are not efficiently conducted, an enormous quantity of energy is consumed (discharge amount of $CO_2$ becomes large). As a result, an earth warming phenomenon caused by an increase in $CO_2$ amount as one of problems about the earth environment may be further promoted.

As the method of solving these problems, a method of reusing by erasing the image on the paper once used has been disclosed. The method of erasing the image is roughly classified into two methods. That is, there have been suggested one method of reducing adhesive properties between an imaging member and a substrate (paper) using a releasing liquid prepared by mixing water or a solvent with a surfactant and applying heat and pressure to peel off the imaging member from the substrate in a wet system, and another method of peeling due to an outer force (e.g. heat, pressure, mechanical force, etc.) without using water and a solvent, or previously forming an image having small adhesive properties and then peeling the imaging member due to heat, pressure, mechanical force and the like in a dry system. The following examples further illustrate the method of solving the above problems in detail.

As the example using water and a surfactant, Japanese Patent Application Laid-Open (JP-A) Nos. 6-250569, 6-208318 and 6-250570 disclose a method of applying heat to an image recording material with being maintained an aqueous solution of a surfactant, hot-melting ink on the image recording material and peeling off ink using a releasing material. In the above references, however, wetting between the image holding material and aqueous solution is important and it is necessary to penetrate the aqueous solution into an interface between the hot-melt ink and image holding material. When solid images are present on both surfaces, the surface of the image holding material repels the aqueous solution, which does not penetrate and, therefore, an effect of improving the peelability between the imaging member and image holding material can not be obtained. As a matter of course, the situation is the same in case of peeling off the image on the OHP sheet. In case of reusing repeatedly the image, a toner remained without being removed is accumulated on the image holding material and, therefore, the quality of the substrate (paper) deteriorates. Since a large amount of heat are required for drying the paper wetted with the aqueous solution, an amount of energy consumed becomes larger and a running cost becomes larger. In case of the color image, a large amount of a toner is used on the total surface of the image holding material in comparison with the monochromic image and, therefore, the surfactant can not penetrate into the image holding material. As a result, an effect of peeling off the toner can not be obtained so that an image recording material can not be reused. Furthermore, when the color image is made again on the image holding material on which the toner is remained, color-developing properties are sometimes changed.

Japanese Patent Application Laid-Open (JP-A) Nos. 1-101576 and 1-101577 direct to a method of dissolving and removing a toner resin by applying or dipping a soluble solvent to the image recording material.

As the example using a solvent, Japanese Patent Application Laid-Open (JP-A) No. 4-300395 discloses a method of adhering a solvent to an image recording material using dipping, spraying or applying means, dissolving a toner in the image recording material and removing the dissolved toner using washing, sucking or adsorbing means to reuse the image recording material. These methods make it possible to remove the imaging member on the image recording material but have a problem such as influence of use of an organic solvent on safety and environment, enormous quantity of energy required for removing the solvent and curling of the paper after drying. Furthermore, there arose a new problem that the toner dissolved in the solvent is adhered again to the image recording material. As a result, the quality of the image holding material reused is not sufficient. Any way, an enormous quantity of energy is required for drying the releasing agent used to remove or erase the imaging member in a wet system. Since an additive (e.g. surfactant, etc.) contained in the releasing agent is accumulated in the image holding material by using repeatedly, an adverse influence is exerted on repeated image formation.

On the other hand, Japanese Patent Application Laid-Open (JP-A) Nos. 1-297294 and 4-67043 suggest an erasing method comprising applying a silicone sealing material on a coated paper in a small thickness, drying the coated material to form a paper (erasable paper) whose surface is releasing-treated, printing on this paper, coating the surface of the print with a hot-melt material (cleaning material) in the hot-melt state for the purpose of cleaning, cooling and then removing a print (e.g. letter image, etc.) together with the hot-melt material. This method had the following drawbacks. That is, the adhesive properties between an imaging member and a releasing agent are not sufficient and, therefore, the releasing agent transfers from the image recording material to the other medium such as transfer roll to exert an adverse influence on the following image formation. Furthermore, the image recording material can not be repeatedly used because the peelability of the image recording material changes due to transfer of the releasing agent. The image recording material subjected to the releasing treatment generally makes it possible to easily remove the imaging member from the substrate, but has a problem that the fixing properties to the substrate and traveling properties (conveying properties) of the substrate deteriorate due to the releasing treatment. Japanese Patent Application Laid-Open (JP-A) No. 6-219068 discloses a reusable recording medium obtained by applying a thermal modified material (e.g. fluorine-containing acrylate material, etc.), wherein adhesive properties between the substrate and imaging member become poor due to heating, to a heat transfer recording paper or impregnating the heat transfer recording paper with the thermal modified material. This recording medium has the same drawback as that of the image recording material subjected to the releasing treatment, and it is necessary to form the part, which is not subjected to the releasing treatment, by previously sealing both ends of the recording medium so as to obtain traveling properties of the recording medium.

Furthermore, according to the method of forming the releasing material on the image recording material as described above, the releasing material is formed on the recording material by dissolving the releasing material in an organic solvent and applying the resulting solution to a substrate or impregnating the substrate with the solution. Therefore, the releasing material is formed on the total surface of the recording material. Thus, the traveling properties and conveying properties of the recording material in the image forming device are serious problems and, furthermore, the writing properties are also serious problems because the releasing material is present even at the part where no image is present. Since the releasing material is generally expensive, a large amount of the releasing material is required in the applying or impregnating method. A low utilization efficiency leads to an increase in cost.

SUMMARY OF THE INVENTION

The present invention has been accomplished for the purpose of solving the problems described above in the prior arts under these circumstances.

That is, an object of the present invention is to provide an image recording paper which makes it possible to promptly reuse a waste paper by an individual without relying on technical vendors and damaging the image of a plain paper. Another object of the present invention is to provide a peelable image recording member which makes it possible to remove an imaging member with maintaining good fixing properties of the imaging member to the image recording paper without injuring the paper surface. A still another object of the present invention is to provide an image forming apparatus using an electrophotographic or heat transfer system (device for producing an image recording material) for obtaining a peelable recording member. A further object of the present invention is to provide an image recording paper which makes it possible to easily reuse not only a monochromic image but also a color image, obtained by full solid printing, using such an image forming device. A still further object of the present invention is to provide an image recording paper which makes it possible to solve a problem about paper passing properties in the device, wherein the material having a peelability has no transfer to the other material.

Another object of the present invention is to provide an image recording paper which makes it possible that, when using the electrophotographic system image forming device, a normal acidic paper has a problem of image quality defects caused by transfer of fillers (e.g. talc, etc.) to the surface of the photosensitive material, however, transfer of the fillers is solved by fixing together with the material having a peelability on the surface of the recording paper. A further object of the present invention is to provide an image recording paper capable of sufficiently coping with imaging members (e.g. pencil, ball-point pen, water-based felt pen, oil-based felt pen, etc.) to the recording paper. A still further object of the present invention is to provide a method for reusing an image forming member, which makes it possible that an image forming member for reusing the image is not previously prepared but a plain paper is used in case of a normal image recording, and the plain paper is converted into a peelable image recording member when reuse is required, i.e. when it is necessary to erase a record because an image forming member is temporarily required.

The present inventors have intensively studied about the peelable image recording member of the present invention. As a result, it has been found that an image forming member can be made on the required position at the required time by previously forming an imaging member containing a releasing material on the total surface or required position of an recording medium for image formation (e.g. plain paper recording paper, converted paper, polyester film used for OHP, etc.) as a thin film having good peelability using an image forming apparatus. It has also been found that the image forming member thus obtained makes it possible to make a peelable image recording member without damaging writing properties on the recording material and to simultaneously satisfy the fixing properties and peelability of the imaging member. The image forming member also makes it possible to easily reuse not only a monochromic image but also a color image, obtained by full solid printing. Thus, the present invention has been accomplished.

The peelable image recording member of the present invention comprises a substrate, and a film which is comprised of an imaging member containing a releasing material, the film being formed on the surface of the substrate. The image forming apparatus of the present invention is characterized in that the image forming apparatus utilizes an electrophotographic system or a heat transfer system, and that a film comprising an imaging member containing a releasing material is formed on a substrate. Furthermore, the method for reusing an image forming member of the present invention comprises the steps of: forming a film comprising an imaging member containing a releasing material on the surface of a substrate; forming an image on the film; and bringing the image and a transfer medium into close contact and applying heat and pressure to transfer the image to the transfer medium.

DETAILED DESCRIPTION OF THE INVENTION

Figure 1:
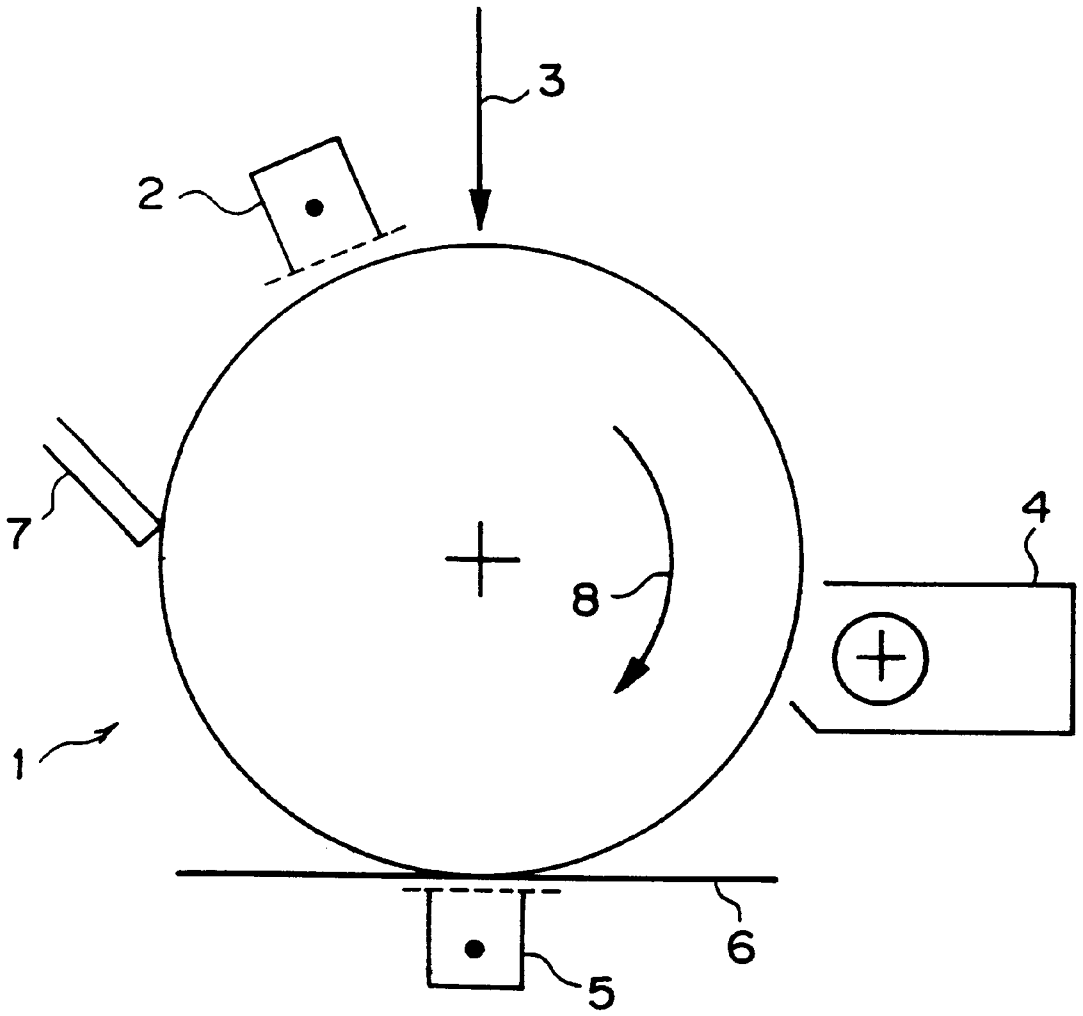
FIG. 1 is a schematic diagram illustrating the electrophotographic system image forming apparatus in the present invention.

According to the peelable image recording member of the present invention, it becomes possible to make a peelable image recording member by containing a releasing material such as fluorine compounds, silicone compounds, synthetic waxes (e.g. polyethylene, polypropylene, etc.) and natural waxes (e.g. carnauba wax, etc.) in an imaging member; making the imaging member on the surface of a recording medium (e.g. plain paper recording paper, converted paper, OHP, etc.) using an image forming apparatus to form a film having a peelability on the recording medium; and transferring an image recorded on the film to a transfer medium, which is opposed to the recording medium, using heat, pressure, etc. It is possible to use the same material which has hitherto been used as the imaging member containing the releasing material and, therefore, adhesive properties to the image recording medium (e.g. plain recording paper, converted paper, OHP, etc.) do not deteriorate. Accordingly, the fixing properties and recording properties of the image recording medium can stand comparison with a conventional image recording medium.

Not only the peelability of an image formed on the upper layer is satisfied by previously forming a releasing layer (peeling layer) using the imaging member containing the releasing material, but also the affinity between the imaging member and image recording material is improved by containing the same material as that of the image recording material (e.g. toner, ink, etc.) as a constituent component of the imaging member. Furthermore, the surface of the releasing layer of the imaging member has a proper unevenness and, therefore, an "anchor effect" due to penetration of the image recording material (e.g. toner, transfer ink, etc.) formed on the upper layer into the unevenness and a cohesive force of the imaging member itself exhibit sufficient fixing properties of the image recording material. On the other hand, when the toner or transfer ink is peeled off, the cohesive force is lowered by heating so that it can flow or melt. Also, the adhesive properties between the imaging member and recording medium are lowered by the releasing layer (peeling layer) formed on the under layer and, at the same time, the adhesive properties between the imaging member and opposite transfer medium are enhanced. Therefore, it is believed that the toner or transfer ink is peeled off from the recording medium by transferring the toner or transfer ink to the opposite transfer medium.

Hereinafter, the peelable image recording member of the present invention will be explained in detail.

Examples of the recording medium which can be used in the present invention include, for example, plain paper and recording paper used generally for electrophotographic recording, heat transfer paper utilized for heat transfer recording, converted paper used for high-grade printing, slight coated paper, transparent resin (e.g. polyester film, styrene-acrylic resin, etc.) used for OHP and the like.

The imaging member used in the present invention contains a releasing material and a binder resin, and is preferably used in the particle form in view of ease of handling and image formation. The releasing material is at least one material selected from the group consisting of fluororesins; silicone resins; copolymer resins of the above resins; copolymer resins of the above resins and resin selected from an acrylic resin and a polyester resin; low molecular weight synthetic waxes selected from polyethylene and polypropylene; and natural waxes selected from the group consisting of carnauba wax, beeswax, montan wax, paraffin wax and microcrystalline wax. Examples of the binder resin used in combination with them include, for example, acrylic resins (e.g. styrene-methacrylic acid copolymer. etc.) used generally as an imaging resin, polyester resins, polyamide resins, polyimide resins, epoxy resins, polycarbonate resins and the like. As the method of forming the binder resin containing these releasing materials into fine particles, for example, there can be used a method of making fine particles by kneading, grinding and classifying and a known method of dispersing an oil phase containing an imaging member in an aqueous medium, followed by granulating. Examples thereof include suspension polymerization method described in Japanese Patent Application Publication (JP-B) No. 36-10231, method described in Japanese Patent Application Publication (JP-B) No. 61-28688 and the like. The suspension polymerization method is a method of dissolving or dispersing a polymeric monomer and a toner material (e.g. colorant, releasing agent. etc.) to form a monomer composition; thereafter dispersing this monomer composition into an aqueous phase containing a dispersion stabilizer using a suitable stirrer; and simultaneously conducting the polymerization reaction to obtain an imaging member having a desired particle size. The method described in Japanese Patent Application Publication (JP-B) No. 61-28688 is a method comprising dissolving or dispersing an imaging member into an organic solvent, which hardly dissolve in water, to form an oil phase; dispersing this oil phase into an aqueous phase containing a dispersion stabilizer; and removing the solvent to make image forming fine particles. Also, there can be used a method comprising adding a new monomer to a dispersion-stabilized oil phase to cause the polymerization reaction at the interface of the oil phase; followed by capsulating to prepare an imaging member. However, the method may be any method capable of granulating an imaging member comprising the releasing material and binder resin, and is not limited to the above methods. In order to peel off the image formed on the upper layer using a film formed by the imaging member containing the releasing material, the releasing material is preferably contained in an amount of 10 to 90% by weight in the solid part of the imaging member, more preferably 30 to 70% by weight, and most preferably 40 to 60% by weight, in view of the effect. When the amount of the releasing material contained in the imaging member is less than 10% by weight, the image formed on the upper layer is not sufficiently peeled off. On the other hand, when it exceeds 90% by weight, it becomes difficult to form as the imaging member and image characteristics (e.g. maintenance, image stability, etc.) in the image forming device deteriorate drastically. Since the adhesive properties between the imaging member and image recording medium also deteriorate, a film forming capability of the releasing layer forming material also reduces.

In order to utilize as the imaging member, it is necessary that the material is white or transparent. A colorant may be formulated into the imaging member for the purpose of distinguishing it from the plain paper recording medium, using to prevent alteration of an image or utilizing it as the reusable imaging member. Examples of the colorant formulated include carbon black, nigrosine, aniline blue, chrome yellow, ultramarine blue, Du Pont oil red, quinoline yellow, methylene blue chloride, phthalocyanine blue, malachite green oxalate, lamp black, rose bengal, C.I. pigment red 48:1, C.I. pigment red 122, C.I. pigment red 57:1, C.I. pigment yellow 97, C.I. pigment yellow 12, C.I. pigment blue 15:1, C.I. pigment blue 15:3, magnetic powder and the like.

It is possible to obtain a peelable image recording member comprising a film which is comprised of an imaging member containing a releasing material, using a heat transfer film wherein the imaging member in the present invention is formed on a film.

According to the method of converting the imaging member containing the releasing material into a transfer film, an ink layer of the transfer film can be obtained by dispersing or dissolving the imaging member into water or an organic solvent, or melting the imaging member itself with heating to form a liquid, and then applying resultant material on a substrate such as polyester film. In order to prevent a sticking phenomenon (the substrate weld to a thermal head, thereby preventing feeding of a ribbon or traveling of the thermal head), the surface, which is directly in contact with the thermal head, may be coated with a heat-resistant resin (e.g. silicone resin, fluorine resin, polyimide resin, etc.) and a high-temperature non-adhesive surfactant, as a heat-resistant layer. The imaging member containing the releasing material of the present invention can also be used as the heat-resistant layer. In addition to the above imaging members, colorants, solid waxes, binder resins, tackifiers, antistatic agents, pigment dispersants, fats and oils (mineral oils), etc. as the ink layer, may be added. In the present invention, the imaging member is preferably white or transparent in order to utilize as the image forming medium. A colorant may be formulated into the imaging member for the purpose of distinguishing it from the plain paper recording medium, using to prevent alteration of an image or utilizing it as the reusable imaging member. The colorants can be used the above colorants of the imaging member. In the present invention, the releasing material is contained in the imaging member and, therefore, a solid wax added for the same purpose is not required furthermore. However, it is possible to separately add a solid wax, which is similar to the releasing material in the present invention, for the purpose of improving performances of the transfer film, e.g. adjustment of a melting point due to the addition of the solid wax. As the binder resin, for example, there can be used EVA (ethylene-vinyl acetate copolymer), polystyrene, polyester, polyvinyl acetate, styrene-butadiene copolymer and the like. As the tackifier, for example, there can be used petroleum resins, polypentene, coumarone-indene resins, rosins and the-like.

It is possible to form a film having a peelability to the imaging member by using the above materials. As far as this function is not damaged, various materials may be used in combination.

As the application method in case of forming these films, for example, there can be used methods which are normally used, such as blade coating method, wire bar coating method, spray coating method, bead coating method, air knife coating method, curtain coating method, rod bar coating method, roll coating method and the like.

Although the drying in case of forming these films may be air drying, the peelability to the imaging member is further improved when thermodrying is conducted. There can be used methods which are normally used, such as method of putting in an oven or passing through the oven, method of bringing it into contact with a heat roller and the like.

In the method for reusing the image forming member, of the present invention, the step of forming a film on the surface of a substrate and step of forming an image on the film are conducted by transferring the film and developed image to the image forming member. The step of bringing the image on the image recording material and transfer medium into close contact and applying heat and pressure to transfer the image to the transfer medium is a step of removing the imaging member from the image recording material wherein the image has been formed. In this case, although an image recording material having a peelability can be used as the transfer medium to the imaging member, this method is preferably the same as that used for forming the imaging member on the image recording paper in view of the principle. For example, according to the heat transfer or electrophotographic system, an image is formed by fixing the imaging member on the paper utilizing heat. The imaging member on the paper is molten by heating again the image, which was once fixed, thereby easily removing the imaging member from the paper. Therefore, if the fixing device in the image forming apparatus can be also used as a peeling device, the image forming device itself can be an image removing apparatus without preparing a special device, separately, and open spaces can be effectively used in comparison with the case of providing the peeling device, separately. As auxiliary means for removing the imaging member, there can be used a method of impregnating the image recording paper with an organic solvent for dissolving the imaging member or, an aqueous solution or an organic solvent containing a surfactant for decreasing bonding between paper fibers and imaging member, or an organic solvent, and a method of removing the imaging member utilizing a physical action (e.g. ultrasonic vibration, etc.) together with these methods.

In the method for reusing the image recording material of the present invention as above-mentiond, the step of forming the film is applied to a portion of a substrate at which portion an image is formed, and heat and pressure can be applied to only the portion and the imaging member can be removed from the portion.

The image forming device of the present invention will be explained with accompanying the drawings.

FIG. 1 is a schematic diagram illustrating the electrophotographic system image forming apparatus. A photosensitive material 1 is driven in the direction of the arrow 8 and a cleaner device 7, a charging device 2, latent image forming means 3, an developing device for imaging member 4, a transfer device 5 and a recording paper 6 are arranged in order on the periphery of the photosensitive material. As the photosensitive material 1 which is used as an image carrier, for example, OPC is used in the embodiment of the present invention. In addition to this, a known photosensitive material (e.g. Se, a-Si, etc.) and a dielectric material having no photosensitivity (e.g. polyethylene terephthalate, aluminum oxide, etc.) can be used. As the charging device 2 for uniformly charging the surface of the image carrier 1, for example, scolotron is used in the embodiment of the present invention and the surface of the image carrier 1 is uniformly charged to negative (−600 V). In addition to this, known roller charging device and brush charging device can be used as the charging device. As the latent image forming means 3, for example, there can be used light writing means represented by laser ROS, means for writing by controlling an ion flow and the like. In the former case, the image carrier 1 is a photosensitive material. In the latter case, it is a dielectric material. The developing device 4 for imaging particles containing the releasing material may be any one which comprises known powder developing means. In the embodiment of the present invention, a two-component magnetic brush developing device is used. The recording paper 6, wherein the image formed on the image carrier is a printing medium, is arranged. As the transfer device 5 for transferring the image, there can be used the same charging device 2 except that a polarity is different. Formation of the image in this construction is conducted as follows. That is, the photosensitive material 1 is driven (circumferential rate: 100 mm/second) in the direction of the arrow 8 using driving means (not shown). Then, the surface of the photosensitive material 1 is charged to −600 V using a scolotron charging device 2 and a static latent image is formed using a laser ROS3. The static latent image is developed using the developing device 4 of image developing means, and then transferred to the recording paper 6 driven by the driving means (not shown) using known transfer means. After transferring, the imaging particles remained on the photosensitive material 1 is removed using the cleaner device 7. Although a system using a cleaner is assumed in the embodiment of the present invention, the present invention can be accomplished by a cleanerless system even if cleanerless is accomplished in any form. Although a blade is used as the cleaner in the embodiment of the present invention, there can be used cleaning means (e.g. brash, cleaning roll, mag brush roll, etc.) as known cleaner means, in addition to the blade. Then, the recording paper is fixed using fixing means (not shown) to obtain an image on the recording paper. That is, an image recording paper having a film comprising the imaging member containing the releasing material is obtained on the surface of the recording paper.

Figure 2:
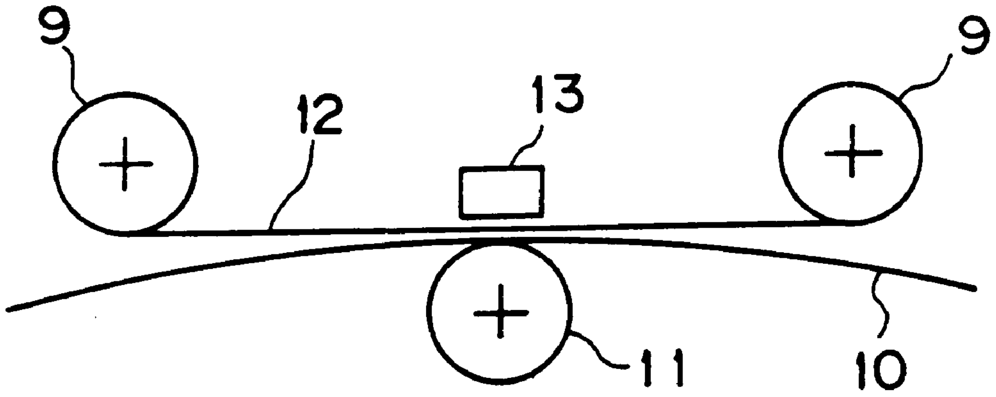
FIG. 2 is a schematic diagram illustrating the heat transfer system image forming apparatus in the present invention.

FIG. 2 is a schematic diagram illustrating the heat transfer system image forming device. All constituent parts are arranged as follows. That is, an ink sheet 12 is conveyed or taken up using a driving roll 9 and the ink sheet 12 and a recording paper 10 are heated and pressurized using a press roll 11 and a heating device 13 and, further, an ink image is recorded on the recording paper. The driving roll 9 for feeding or taking up the ink sheet for image formation 12 is arranged as shown in FIG. 2. The ink sheet 12 is provided with a releasing layer so as to easily peel off ink from a heat transfer film such as polyester, polyimide and the like, and ink for image formation containing the releasing material is applied on the releasing layer to form an ink sheet. The recording paper 10 may be any one which is generally used in the heat transfer system, such as plain paper, surface coated paper, OHP paper and the like. The press roll 11 for pressing the recording paper 10 and ink sheet 12 is arranged. As the heating device 13, a ceramic heater is used in the embodiment of the present invention. In addition to this, there can be used heating devices having known heating means such as heat roll heating, planar heating unit, magnetic induction heating and the like. The ink sheet 12 and recording paper 10 are moved in the same direction and interposed between the press roll 11 and heating device (ceramic heater) 13, where they are heated and pressurized, thereby transferring ink on the ink sheet to the recording paper to record an image on the recording paper. That is, there can be obtained an image recording paper having a film comprising ink for forming image, which containing a releasing material, on the surface of the recording paper.

EXAMPLES

The following Examples and Comparative Examples further illustrate the present invention in detail but are not to be construed to limit the scope thereof. In the Examples and Comparative Examples, "parts" are by weight unless otherwise stated. In Examples 1 to 5 and 9 to 10, and Comparative Example 1 the electrophotographic system was used for the image forming device. In Examples 6 to 8, the heat transfer system was used for the image forming device.

Example 1

20 parts of a low molecular weight polyethylene wax (Mitsui Hi-wax 2203A, manufactured by Mitsui Petrochemical Industries Co., Ltd.), and 80 parts of a polyester resin (Tm: 100° C. , Tg: 63° C., acid value: 13) synthesized by copolymerizing an propylene oxide adduct of bisphenol A and a terephthalic acid derivative were kneaded, ground and then classified to prepare transparent imaging particles having an average particle size of 7.5 μm (content of a releasing material in imaging particles: 20% by weight). Silica (1%, R972 manufactured by Nihon Aerosil Co.) was mixed with the resulting imaging particles and a solid image was formed on a J paper for Xerox (A4 size, manufactured by Fuji Xerox Co.) using Acolor 635 (manufactured by Fuji Xerox Co.) and the resultant was taken as a reusable image recording material. A color image including letters and solid images was fixed on this image recording material using Acolor 635.

The fixing properties of the imaging member were evaluated by using, as an index, a ratio of an image density before peeling to that after peeling (hereinafter abbreviated to an "OD ratio") determined by adhering a commercially available cellophane adhesive tape having a width of 18 mm (cellophane tape, manufactured by Nichiban Co., Ltd) on the solid image part having a density of about 1.8 (density of the image fixed by the above electrophotographic system image forming device shown in FIG. 1 is measured by using a densitometer X-Rite 938 (manufactured by X-Rite Co.)) at a linear pressure of 300 g/cm and then peeling the adhesive tape at a rate of 10 mm/second (OD ratio: image density after peeling/image density before peeling). It is necessary that the imaging member has fixing properties (OD ratio: not less than 0.8) as an electrophotographic recording medium.

In case of reusing the recorded image, a heat roller having a silicone rubber surface layer in a fixing device of the above image forming device was replaced by a heat roller whose surface is coated with an aluminum anodic oxidized film and, furthermore, a metal blade for scraping the imaging particles from the paper was mounted on the heat roller. Only by passing the image recorded material, on which the image has been recorded, through the fixing device of the above device, the imaging particles could be removed to reuse the image recording paper. After removing the imaging particles, the residual amount of them on the reused paper was evaluated by using the OD ratio as the index according to the same manner as that of the evaluation of the fixing properties of the imaging particles. As the image density wherein we do not concern ourselves with the residual amount, the OD ratio of not more than 0.08 is preferred. The fixing properties of the image recording onto the paper and the imaging particles after removal of the image on the paper were repeated ten times, and the residual amount of the imaging particles on the reused paper after removal were evaluated and the repeating stability was confirmed. The results of the respective Examples and Comparative Examples described hereinafter are shown in Table 1.

TABLE 1

| | Before repeating reuse | | After repeating reuse ten times | |
|---|---|---|---|---|
| | Fixing properties (OD ratio) | After peeling (OD ratio) | Fixing properties (OD ratio) | After peeling (OD ratio) |
| Ex. 1 | 0.97 | 0.07 | 0.90 | 0.08 |
| Comp. Ex. 1 | 0.98 | 0.40 | 0.85 | 0.50 |
| Ex. 2 | 0.98 | 0.02 | 0.95 | 0.05 |
| Ex. 3 | 0.99 | 0.03 | 0.95 | 0.05 |
| Ex. 4 | 0.95 | 0.06 | 0.90 | 0.07 |
| Ex. 5 | 0.90 | 0.06 | 0.85 | 0.07 |
| Ex. 6 | 0.92 | 0.07 | 0.90 | 0.07 |
| Ex. 7 | 0.90 | 0.06 | 0.85 | 0.07 |
| Ex. 8 | 0.95 | 0.02 | 0.94 | 0.04 |
| Ex. 9 | 0.97 | 0.03 | 0.95 | 0.05 |
| Ex. 10 | 0.90 | 0.06 | 0.90 | 0.07 |

Comparative Example 1

According to the same manner as that described in Example 1 except for using 5 parts of a low molecular weight polyethylene wax and 95 parts of a polyester resin, imaging particles were prepared (content of a releasing material in imaging particles: 5% by weight). According to the same manner as that described in Example 1, a solid image was formed on a Xerox paper using the resulting imaging particles. A color image including letters and solid images was fixed on the image recording material using Acolor 635. According to the same manner as that described in Example 1, the fixing properties, peelabilities and writing properties of the image on the image forming member were evaluated.

Example 2

(Synthesis of Polyester-silicone Copolymer)

In a 1 liter glass flask equipped with a stirring device, a thermometer, a condenser, an ester adapter and a vacuum device, dimethyl 2,6-naphthalenedicarboxylate (73.2 g, 0.3 mol), dimethyl terephthalate (135.8 g, 0.7 mol), 2,2-di(4-hydroxypropoxyphenyl)propane (206.4 g, 0.6 mol), ethylene glycol (124.0 g, 2.0 mol), tetrabutyl titanate (0.27 g. 0.8 mmol) and epoxy group-containing dimethyl polysiloxane (111.4 g, 0.2 mol) represented by the following [Chemical formula 1] were charged. Then, the demethanolation reaction was conducted by heating at 160 to 170° C. using a mantle heater under a nitrogen flow for 6 hours. In that case, an amount of methanol distilled off in an ester adapter was 62.1 g.

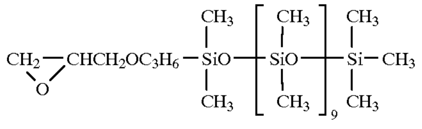

After heating to 220° C. over one hour, the deethyleneglycolation reaction was conducted at 220 to 240° C. under reduced pressure of 20 mmHg for 3 hours. An amount of ethylene glycol distilled off was 71. 2 g. After the completion of the reaction, the resulting polymer was cooled to room temperature to obtain 386.9 g of a pale brown translucent solid. A weight-average molecular weight (calibrated by the standard polystyrene) in GPC was 20,000 and a glass transition point determined by DSC (differential scanning calorimeter) was 66° C. and, further, a softening point determined by the ring and ball method was 115° C. A hydroxyl group value (JIS K 0070) was 25.7 mg KOH/g. The corresponding monomer was composed of a polycarboxylic acid of a molar ratio represented by the following (Chemical formula 2) and a polyhydric alcohol of a molar ratio represented by the following (Chemical formula 3). Furthermore, the quantitative analysis of dimethyl polysiloxane was conducted by atomic-absorption spectroscopy. As a result, 19.9% by weight of the resulting polymer was dimethyl siloxane.

Chemical formula 2

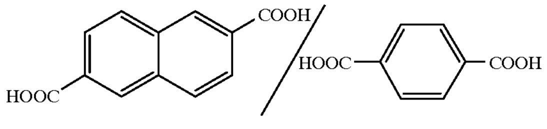

= 0.31/0.69

-continued

Chemical formula 3

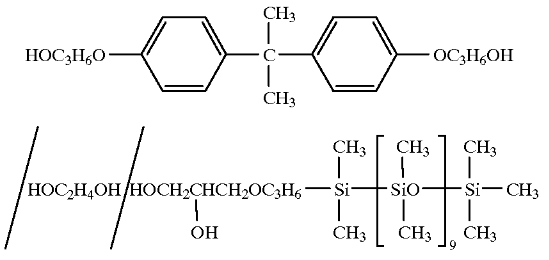

= 0.39/0.53/0.08

(Synthesis of Silicon Graft Polyester)

In a 1 liter glass flask equipped with a stirring device, a thermometer, a condenser, an ester adapter and a vacuum device, dimethyl terephthalate (196.6 g), phthalic anhydride (37.5 g), 2,2-di(4-hydroxypropoxyphenyl)propane (285.5 g), ethylene glycol (157.1 g), glycerin (23.3 g) and tetrabutyl titanate (0.33 g) were charged. Then, the demethanolation reaction was conducted by heating at 160 to 170° C. using a mantle heater under a nitrogen flow for 6 hours. In that case, an amount of methanol distilled off in an ester adapter was 61.3 g.

After heating to 220° C. over one hour, the deethyleneglycolation reaction was conducted at 220 to 240° C. under reduced pressure of 20 mmHg for 3 hours. An amount of ethylene glycol distilled off was 120.4 g. After the completion of the reaction, the resulting polymer was cooled to room temperature to obtain 471.4 g of a pale brown translucent solid. A weight-average molecular weight (calibrated by the standard polystyrene) in GPC was 10,260 and a glass transition point determined by DSC (differential scanning calorimeter) was 67° C. and, further, a softening point determined by the ring and ball method was 122° C. A hydroxyl group value (JIS K 0070) was 38.6 mg KOH/g. In a 1 liter glass flask equipped with a stirring device, a thermometer and a condenser, polyester polyol (150 g) obtained in the above Synthesis Example and toluene (300 g) were charged, and then dissolved at 60° C. Then, dibutyltin dilaurate (0.17 g) and isocyanate group-containing organopolysiloxane (17.8 g) represented by the following (Chemical formula 4) were added, and the mixture was reacted at 70° C. under a nitrogen flow for 5 hours. IR spectroscopic analysis of the resulting reaction liquid was conducted. As a result, absorption at 2260 $cm^{-1}$, 1094 $cm^{-1}$ and 1260 $cm^{-1}$ caused by NCO observed before the reaction was observed, thereby confirming that the substance obtained by the reaction is a polyester grafted with organopolysiloxane. Toluene as the solvent was removed from the reaction liquid by stripping to obtain 151.2 g of a silicone graft polyester as a pale brown translucent solid.

In the resultant polyester, a weight-average molecular weight (calibrated by the standard polystyrene) in GPC was 11,500 and a softening point determined by the ring and ball method was 97° C. and, further, a glass transition point determined by DSC was 51° C.

Chemical formula 4

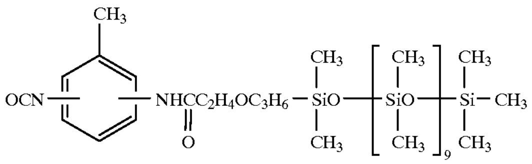

50 Parts of a copolymer (FX-3330, manufactured by Sumitomo 3M Co., ethyl acetate solution having a solid content ratio of 30%) of a fluororesin and an acrylic resin, 15 parts of a polyester resin (Tg: 66° C., Tm: 105° C.) comprising a propylene oxide adduct of bisphenol A, an ethylene oxide adduct of bisphenol A and a succinic acid derivative, 1.5 parts of the above polyester-silicone copolymer, 0.9 parts of silyl isocyanate (Orgatix SI-310, manufactured by Matsumoto Seiyaku Co.) and 3 parts of an adduct (Takenate D-110N, manufactured by Takeda Chemical Industries, Ltd.) of xylene diisocyanate (3 mol) and trimethylolpropane (1 mol) were mixed with stirring to prepare an oil phase. 120 Parts of an aqueous solution of 2% carboxylmethylcellulose sodium (Cellogen BS-H, manufactured by Daiichi Kogyo Seiyaku Co., Ltd.) was taken as the aqueous phase. The oil phase was poured into the aqueous phase, emulsified, dispersed and formed into fine particles and then the solvent in the oil phase was removed by heating. Furthermore, the resultant was filtered and dried to obtain pinkish imaging particles having an average particle size of 7.5 μm (content of a releasing material in imaging particles: 70% by weight). According to the same manner as that described in Example 1, a solid image was formed on a Xerox paper using the resulting imaging particles. A color image including letters and solid images was fixed on the image recording material using Acolor 635. According to the same manner as that described in Example 1, the fixing properties and peelabilities of the image on the image forming member were evaluated.

Example 3

According to the same manner as that described in Example 2 except for changing to 70 parts of a copolymer (FC-725, manufactured by Sumitomo 3M Ltd., butyl acetate solution having a solid content ratio of 30% by weight) of a fluororesin and an acrylic resin, 9 parts of a polyester resin (Tg: 66° C., Tm: 105° C.) comprising a propylene oxide adduct of bisphenol A, an ethylene oxide adduct of bisphenol A and a succinic acid derivative and 2.1 parts of the above polyester-silicone copolymer, imaging particles (content of a releasing material in imaging particles: 90% by weight) were prepared. According to the same manner as that described in Example 1, an image forming member whose total surface is coated with imaging particles was prepared using the resulting imaging particles. According to the same manner as that described in Example 1, an image was recorded on this image forming member, and fixing properties and peelabilities thereof were evaluated.

Comparative Example 2

A trial of preparing imaging particles was made using the same materials as those of Example 2 except for using 100 parts of a copolymer (FX-3330, manufactured by Sumitomo 3M Ltd.) of a fluororesin and an acrylic resin and using no polyester resin of Example 2 under the same conditions. However, formation of particles (emulsification) in the solution could not conducted using only a releasing material. As a result, imaging particles could not be prepared.

Example 4

According to the same manner as that described in Example 2 except for using the above polyester-silicone copolymer in place of the copolymer (FX-3330) of the fluororesin and acrylic resin of Example 2, imaging particles (content of a releasing material in imaging particles: 70% by weight) were prepared. According to the same manner as that described in Example 1, an image forming member whose total surface is coated with imaging particles was prepared using the resulting imaging particles. According to the same manner as that described in Example 1, an image was recorded on this image recording member, and fixing properties and peelabilities thereof were evaluated.

Example 5

According to the same manner as that described in Example 2 except for using the above silicon graft polyester in place of the copolymer (FX-3330) of the fluororesin and acrylic resin used in Example 2, imaging particles (content of a releasing material in imaging particles: 70% by weight) were prepared. According to the same manner as that described in Example 1, an image recording member whose total surface is coated with imaging particles was prepared using the resulting imaging particles. According to the same manner as that described in Example 1, an image was recorded on this image recording member and fixing properties and peelabilities thereof were evaluated.

Example 6

The imaging member of Example 2 was diluted with THF (tetrahydrofuran) so that the concentration of the solid content became 10% and a polyester film was coated with the resulting solution using a wire bar, followed by drying at the temperature of 100° C. to prepare a transfer film having an ink layer (thickness: about 3 μm) containing a releasing material. This transfer film was mounted to a heat transfer device FNP-300 manufactured by Matsushita Electric Industrial Co., Ltd. (heat transfer system image forming device shown in FIG. 2) and a full solid image was printed on a J paper for Xerox (A4 size). The resultant was used as a peelable image recording member. A color image including letters and solid images was fixed on this image recording material using Acolor 635.

The fixing properties and peelabilities of the imaging member were evaluated according to the same manner as that described in Example 1.

Example 7

According to the same manner as that described in Example 6 except for using the imaging member of Example 4, a transfer film was prepared. This transfer film was mounted to a heat transfer device FNP-300 manufactured by Matsushita Electric Industrial Co., Ltd. and a full solid image was printed on a J paper for Xerox (A4 size). The resultant was used as a peelable image recording member. A color image including letters and solid images was fixed on this image forming member using Acolor 635.

The fixing properties and peelabilities of the imaging member were evaluated according to the same manner as that described in Example 1.

Example 8

A monochromic image was printed on the image recording material obtained in Example 7 using a heat transfer device FNP-300 manufactured by Matsushita Electric Industrial Co., Ltd.

The fixing properties and peelabilities of the imaging member were evaluated according to the same manner as that described in Example 1.

Example 9

The same image as that, which is finally printed, was printed by using Acolor 635 (manufactured by Fuji Xerox Co.) on a J paper for Xerox (A4 size, manufactured by Fuji Xerox Co.) using the imaging particles containing a releasing material obtained in Example 2 to prepare a transparent image recording material containing a releasing material. A color image, which is the same as that used here, was printed using normal image recording particles and Acolor 635, and then fixed. The fixing properties and peelabilities of the imaging member were evaluated according to the same manner as that described in Example 1.

Example 10

A color image including letters and solid images was fixed on the image recording material obtained in Example 2 using Acolor 635. The fixing properties was evaluated according to the same manner as that described in Example 1. In case of reusing the recorded image, an image erasing device equipped with a press roll, which is opposite to a thermal head, capable of simultaneously applying heat and pressure was arranged in place of the fixing device of the electrophotographic system image forming device of Example 1. After the printing surface of an OHP sheet for Acolor was laminated on the above image recording material wherein color images prepared as above-mentioned have been recorded, they were passed through the image erasing device with sending an electric current to the thermal head according to the image pattern of the image portion to be erased. Immediately after passing, only a desired image was transferred to the OHP sheet and the other image was erased by separating the image recording material from the OHP sheet. The peelabilities of the images were evaluated according to the same manner as that described in Example 1.

As is apparent from the above Examples, the reusable recording paper of the present invention has the following excellent effects.

According to the present invention, by providing an image recording device with a device of printing the imaging particles of the present invention and a transfer film, not only a plain paper recording medium can be utilized as it is without preparing a particular image recording medium, previously, but also the image recording material can be reused there and then when reuse of the recording material is required. Furthermore, a treatment for reuse has hitherto been required to the portion which is not necessary for generation of the image but it becomes possible to treat only the required portion. Therefore, not only the facility is improved but also high-cost materials such as releasing material can be saved. Drastic saving of energy can be accomplished by performing a reusing step of the image recording material in a complete dry system without using releasing agents (e.g. water, organic solvent, surfactant, etc.) which can not be easily utilized at an office or a home and without requiring an enormous quantity of energy so as to dry them. It becomes possible to repeat printing and generating of those which was once subjected to a treatment for reuse, many times. In the present invention, antipodal characteristics such as fixing properties and peelability in the imaging member are sufficiently satisfied at the same time by forming a film, which is made of the same material as that of the imaging member and is superior in releasability, on the substrate without deteriorating the image of the plain paper. Furthermore, it becomes possible to sufficiently reuse not only a monochromic copy but also a copy of a color image and further full solid image. An excellent effect that the stability of repeating (repeating of image formation and erasing of the image) is very good is recognized. This effect is not expected in a conventional reusable recording paper. Not only an unit cost of a paper per one copy is reduced and an economic effect becomes high but also an effect of saving of paper resources and a decrease in amount of $CO_2$ discharged into air (prevention of warming of the earth) is expected in view of the field of the earth environment.

What is claimed is:

1. A peelable image recording member for receiving and fixing image particles thereon and for peeling image forming particles therefrom, comprising:

a substrate; and a substantially white or transparent film formed on the substrate, the film comprising substantially the same material as that of image forming particles that are receivable and fixable on the image recording member, the image forming particles comprising a binder resin, from about 30 to 90 wt % of a releasing material, and optionally a colorant, wherein the image forming particles are peelable from the image recording member to remove at least an image formed on the film from the substrate such that the image recording material is reusable.

2. The peelable image recording member of claim 1, wherein the image forming particles comprise 40 to 60 wt % of the releasing material.

3. The peelable image recording member according to claim 1, wherein the releasing material is at least one material selected from the group consisting of fluororesins; silicone resins; copolymer resins of fluororesins and a resin selected from the group consisting of an acrylic resin and a polyester resin; copolymer resins of silicone resins and a resin selected from the group consisting of an acrylic resin and a polyester resin; copolymer resins of fluororesins, silicone resins and a resin selected from the group consisting of an acrylic resin and a polyester resin; low molecular weight synthetic waxes selected from polyethylene and polypropylene; and natural waxes selected from the group consisting of carnauba wax, beeswax, montan wax, paraffin wax and microcrystalline wax.

4. The peelable image recording member of claim 1, wherein the image forming particles are peelable from the image recording member such that the substrate is reusable.

5. The method of claim 4, wherein the image forming particles comprise the colorant.

6. The method of claim 4, wherein the image forming particles include image forming particles that comprise the colorant and image forming particles that comprise none of the colorant.

7. The method of claim 4, wherein the step of removing comprises removing a first image formed by the particles that comprise the colorant separately from removing a second image formed by the particles that comprise none of the colorant.

8. The peelable image recording member of claim 1, wherein the image forming particles comprise the colorant.

9. The peelable image recording member of claim 1, wherein the image forming particles include image forming particles that comprise the colorant and image forming particles that comprise none of the colorant.

10. An image forming apparatus for forming an image with image forming particles on a substrate and peeling the image forming particles from the substrate, comprising:

a substantially white or transparent film forming device for forming a substantially white or transparent film formed on the substrate, the film comprising substantially the same material as the image forming particles, the image forming particles comprising a binder resin, from about 30 to 90 wt % of a releasing material, and optionally a colorant;

an image forming device for forming an image on the film; and a removing device for removing at least the image from the substrate.

11. The image forming apparatus of claim 10, wherein 40 to 60 wt % of the image forming particles are the releasing material.

12. The image recording apparatus according to claim 10, wherein the releasing material is at least one material selected from the group consisting of fluororesins; silicone resins; copolymer resins of fluororesins and silicone resins; copolymer resins of fluororesins and a resin selected from the group consisting of an acrylic resin and a polyester resin; copolymer resins of silicone resins and a resin selected from the group consisting of an acrylic resin and a polyester resin; copolymer resins of fluororesins, silicone resins and a resin selected from the group consisting of an acrylic resin and polyester resin; low molecular weight synthetic waxes selected from polyethylene and polypropylene; and natural waxes selected from the group consisting of carnauba wax, beeswax, montan wax, paraffin wax and microcrystalline wax.

13. The image forming apparatus of claim 10, wherein the image forming particles comprise the colorant.

14. The image forming apparatus of claim 10, wherein the image forming particles include image forming particles that comprise the colorant and image forming particles that comprise none of the colorant.

15. A method of reusing a peelable image recording member for forming an image with image forming particles on a substrate and peeling the image forming particles from the substrate, comprising the steps of:

forming a substantially white or transparent film on the substrate, the film comprising substantially the same material as the image forming particles, the image forming particles comprising a binder resin, from about 30 to 90 wt % of releasing material, and optionally a colorant;

forming an image on the film; and removing at least the image from the substrate.

16. The method of claim 15, wherein 40 to 60 wt % of the image forming particles are releasing material.

17. The method of reusing the peelable image recording member according to claim 15, wherein the releasing material is at least one material selected from the group consisting of fluororesins; silicone resins; copolymer resins of fluororesins and silicone resins; copolymer resins of fluororesins and a resin selected from the group consisting of an acrylic resin and a polyester resin; copolymer resins of silicone resins and a resin selected from the group consisting of an acrylic resin and polyester resin; copolymer resins of fluororesins, silicone resins and a resin selected from the group consisting of an acrylic resin and a polyester resin; low molecular weight synthetic waxes selected from polyethylene and polypropylene; and natural waxes selected from the group consisting of carnauba wax, beeswax, montan wax, paraffin wax and microcrystalline wax.

* * * * *